(12) United States Patent
Lawrence

(10) Patent No.: US 7,171,649 B1
(45) Date of Patent: Jan. 30, 2007

(54) OPTIMIZING SAFE DOWNCASTING IN AN OBJECT-ORIENTED PROGRAMMING LANGUAGE

(75) Inventor: Peter A. Lawrence, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 506 days.

(21) Appl. No.: 10/756,584

(22) Filed: Jan. 12, 2004

(51) Int. Cl.
*G06F 9/44* (2006.01)

(52) U.S. Cl. .................................... 717/116; 717/151
(58) Field of Classification Search ................ 717/116, 717/151
See application file for complete search history.

(56) References Cited

U.S. PATENT DOCUMENTS

| | | | | |
|---|---|---|---|---|
| 5,369,766 A | * | 11/1994 | Nakano et al. | 719/332 |
| 5,822,590 A | * | 10/1998 | Gupta | 717/136 |
| 5,838,977 A | * | 11/1998 | Gupta | 717/156 |
| 5,991,538 A | * | 11/1999 | Becker | 717/140 |
| 6,138,269 A | * | 10/2000 | Ball et al. | 717/108 |
| 6,405,363 B1 | * | 6/2002 | Carlson et al. | 717/100 |
| 6,721,807 B2 | * | 4/2004 | Vlissides | 719/315 |

OTHER PUBLICATIONS

"The Design and Evolution of C++", Bjarne Stroustrup, Mar. 9, 1994, pp. 305-336.*
Multiple Downcasting Techniques, Puppydog P.O.P et al, 1999, ACM SIGSOFT, pp. 69-75.*
Copy with Type Casts in C, Michael Siff et al, ACM, pp. 180-198,Oct. 1999.*
Pointer Analysis for Programs with Structures and Casting, Suan His Yong et Al, ACM 1999, pp. 91-103.*
Borland C++ 3.0 , User's Guide, 1991, pp. 21-25.*
Fast Static Analysis of C++ Virtual Function Calls, David f. Bacon et al, IBM, ACM, 1996, pp. 324-341.*
"Coping with Type Casts in C", Michael Siff et al, ACM, pp. 180-198, 1999.*
Publication: "Eliminating Virtual Function Calls in C++ Programs", by Gerald Aigner, ECOOP 1996 Conference Proceedings, Springer Verlag LNCS 1098, pp. 142-166.

* cited by examiner

*Primary Examiner*—Todd Ingberg
(74) *Attorney, Agent, or Firm*—Park, Vaughan & Fleming, LLP; Edward J. Grundler

(57) ABSTRACT

A system is presented for optimizing safe downcasting and similar programming idioms in an object-oriented programming language. The system operates by receiving a source program written in the object-oriented programming language. The system compiles this source program into an intermediate representation. Next, the system examines the intermediate representation to identify the use of a virtual function call to determine if an object of a given base class is a member of a given derived class. Such usage facilitates safe downcasting of the object from the given base class to the given derived class. If the intermediate representation uses the virtual function call in this manner, the system replaces the virtual function call with a comparison of a virtual function table pointer associated with the object to an address of a virtual function table associated with the given derived class. The compiler finishes compiling the intermediate representation into executable binary code.

16 Claims, 3 Drawing Sheets

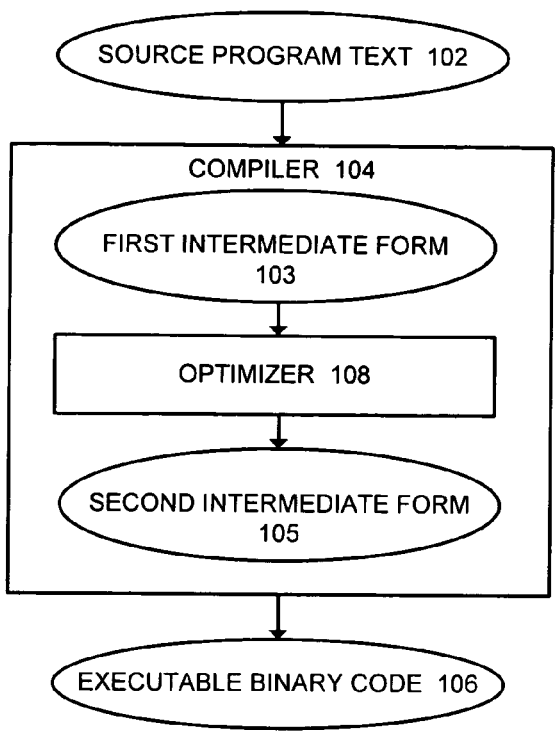
FIG. 1
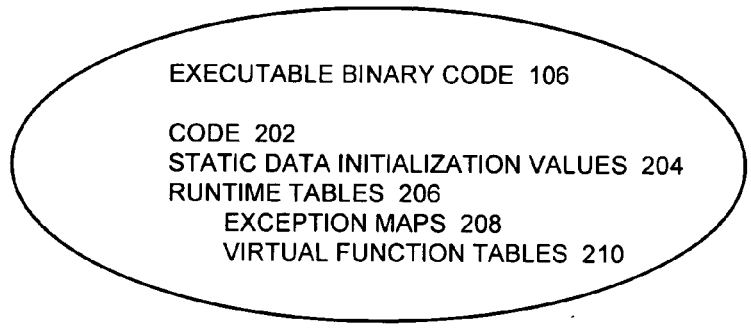
FIG. 2
CLASS HIERARCHY 302
BASE 304
    A 306
    B 308
        BB 310
BASE2 312
    A 314
    C 316
FIG. 3

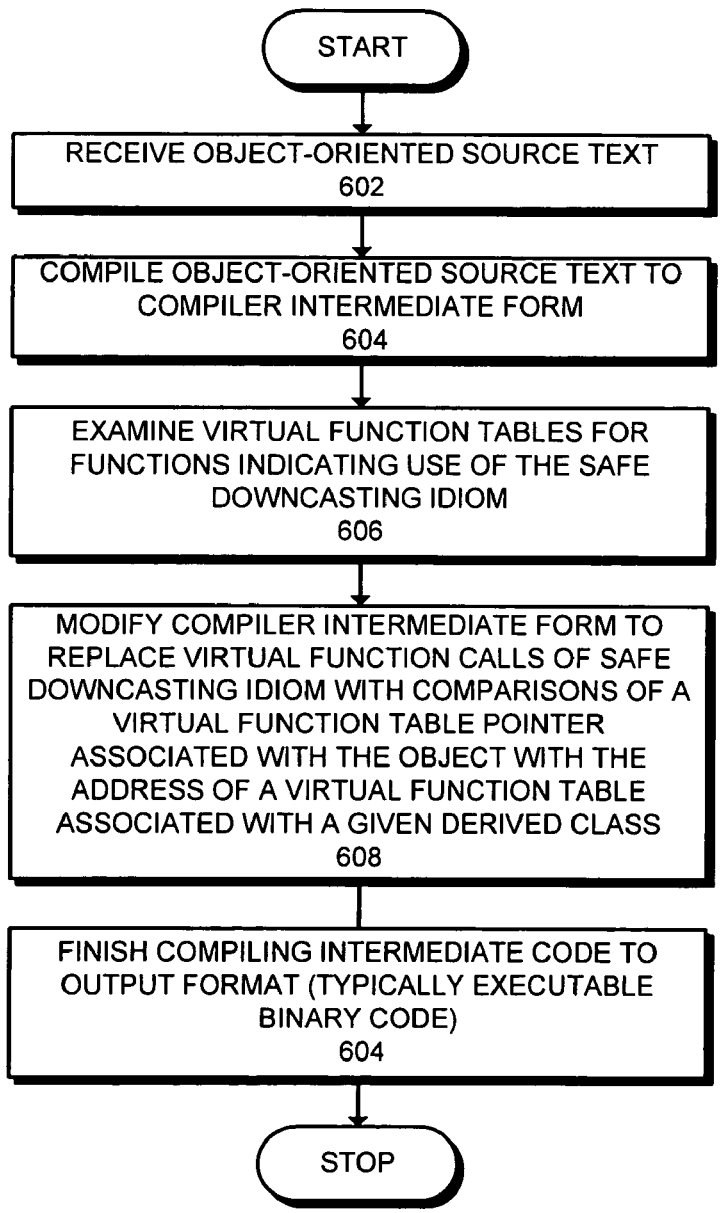

OPTIMIZING SAFE DOWNCASTING IN AN OBJECT-ORIENTED PROGRAMMING LANGUAGE

BACKGROUND

1. Field of the Invention

The present invention relates to optimization of computer code. More specifically, the present invention relates to a method and an apparatus for optimizing safe downcasting and similar programming idioms in an object-oriented language.

2. Related Art

Computer programs written in modern computing languages, and particularly programs written in object-oriented languages, typically include conventions and idioms, which are designed to make the source code more readable and easier to understand by a programmer and to make the executable code more robust during execution. While these conventions and idioms are useful, they typically introduce inefficiencies into the executable code for the program.

Table 1 illustrates an unsafe cast operation that casts a pointer from type "base *" to derived type "A *." Note that this code will cast the pointer "p" to type "A*" regardless of whether the object pointed to by "p" is of type "A*," type "B*," or type "BB*."

TABLE 1

```
class base {
};
class A:base {
};
class B:base {
};
class BB:B {
};
foo (base * p) {
  A * ap;
  ap = (A*)p;
}
```

Safe downcasting is a particularly useful idiom for ensuring that casting operations on an object of a base type to an object of a derived type are proper. Table 2 illustrates the safe downcasting idiom.

In the safe downcasting idiom, the base class ("base" in this example) includes a virtual function for each derived class of the base class. These virtual functions each return a NULL pointer. In each derived class, the virtual function for that derived class is defined to return the "this" pointer for the object, while the virtual function for the other derived classes inherit the NULL pointer return from the base class. Since the compiler is necessarily aware of the type of the object pointed to by "p", calling the "as_X( )" method of a derived class "X" returns a NULL pointer if the object is not of that derived class, and a "this" pointer if the object is of that derived class. Note that "as_X" implies calling the "as_A," "as_B," or "as_BB" function as required. Thus, the safe downcasting idiom ensures that the correct downcast is used for subsequent code.

As an example, the function "foo" uses an "if-else" structure to determine the proper derived type of the pointer "p." The statement:

"if ((ap = p→as_A( )) != NULL)"

assigns "this" to ap if p points to an "A" object. Otherwise, the statement assigns NULL to ap. The test for "not equal to NULL" can then be used to determine whether to use the code for an object of derived type "A." Likewise, the statements:

"if ((bp = p→as_B( )) != NULL)"
and "if ((bbp = p→as_BB( )) != NULL)"

can be used to determine if the object is of derived type "B" or "BB," respectively.

TABLE 2

```
class A;
class B;
class BB;
class base {
public:
    virtual class A * as_A ( )    {return NULL; }
    virtual class B * as_B ( )    {return NULL; }
    virtual class BB * as_BB ( )  {return NULL; }
};
class A:base {
    virtual class A * as_A ( ) {return this; }
    // note as_B returning NULL is inherited from base by default
    // note as_BB returning NULL is inherited from base by default
};
class B:base {
    virtual class B * as_B ( ) {return this; }
    // note as_A returning NULL is inherited from base by default
    // note as_BB returning NULL is inherited from base by default
};
class BB:base {
    virtual class BB * as_BB ( ) {return this; }
    // note as_B returning this is inherited from class B by default
    // note as_A returning NULL is inherited from base by default
};
foo (base * p) {
    class A * ap;
    class B * bp;
    class BB * bbp;
    if ((ap = p->as_A ( )) != NULL) {
        // use ap
    } else
    if ((bp = p->as_B ( )) != NULL) {
        if ((bbp = p->as_BB ( )) != NULL) {
            // use bbp
        } else {
            // use bp
        }
    }
}
```

This safe downcasting idiom can guarantee that the proper code is used for the derived type of the object and uses the following steps:

fetch the virtual function table pointer from p→;
fetch the "as_X" function pointer from the virtual function table;
indirectly call the "as_X" function via this pointer;
a. the result is set to NULL, or set to "this," depending on which virtual function got called;
b. return from the function; and
compare the function result with the NULL pointer.

This series of steps, particularly the indirect function call and its associated return, is expensive in terms of the number of machine cycles required.

Hence, what is needed is a method and an apparatus for optimizing safe downcasting and similar programming idioms in an object-oriented programming language to reduce the number of required machine cycles.

SUMMARY

One embodiment of the present invention provides a system for optimizing safe downcasting and similar programming idioms in an object-oriented programming language. The system operates by first receiving a source program written in the object-oriented programming language. The system compiles this source program into an intermediate representation using a compiler. Next, the system examines the intermediate representation to identify the use of a virtual function call to determine if an object of a given base class is a member of a given derived class, wherein such usage facilitates safe downcasting of the object from the given base class to the given derived class. If the intermediate representation uses the virtual function call in this manner, the system replaces the virtual function call with a comparison of a virtual function table pointer associated with the object to an address of a virtual function table associated with the given derived class. The compiler then finishes compiling the intermediate representation into an executable binary code.

In a variation of this embodiment, the intermediate representation includes virtual function tables generated by the compiler. These virtual function tables are referenced during execution of the executable binary code to perform operations on the object. Entries in the virtual function tables point to executable code for objects of a specified class.

In a further variation, examining the intermediate representation involves examining virtual function tables within a class hierarchy in the intermediate representation to locate identically named virtual functions. One of these identically named virtual functions for one derived class of a base class returns a pointer to the object and other identically named virtual functions of the remaining derived classes of the base class return a null pointer.

In a further variation, if the identically named virtual function of more than one derived class of the base class returns a pointer to the object and other identically named virtual functions of the remaining derived classes of the base class return the null pointer, the system replaces the virtual function call with a sequence of instructions that identify the more than one derived class of the base class.

In a further variation, examining the intermediate representation involves examining the intermediate representation within an optimizer associated with the compiler.

BRIEF DESCRIPTION OF THE FIGURES

FIG. 1 illustrates the process of compiling source program text into executable binary code in accordance with an embodiment of the present invention.

FIG. 2 illustrates some components of an executable binary code in accordance with an embodiment of the present invention.

FIG. 3 illustrates a class hierarchy in accordance with an embodiment of the present invention.

FIG. 5 illustrates an optimizer in accordance with an embodiment of the present invention.

FIG. 6 is a flowchart illustrating the process of optimizing safe downcasting in accordance with an embodiment of the present invention.

Figure 4:
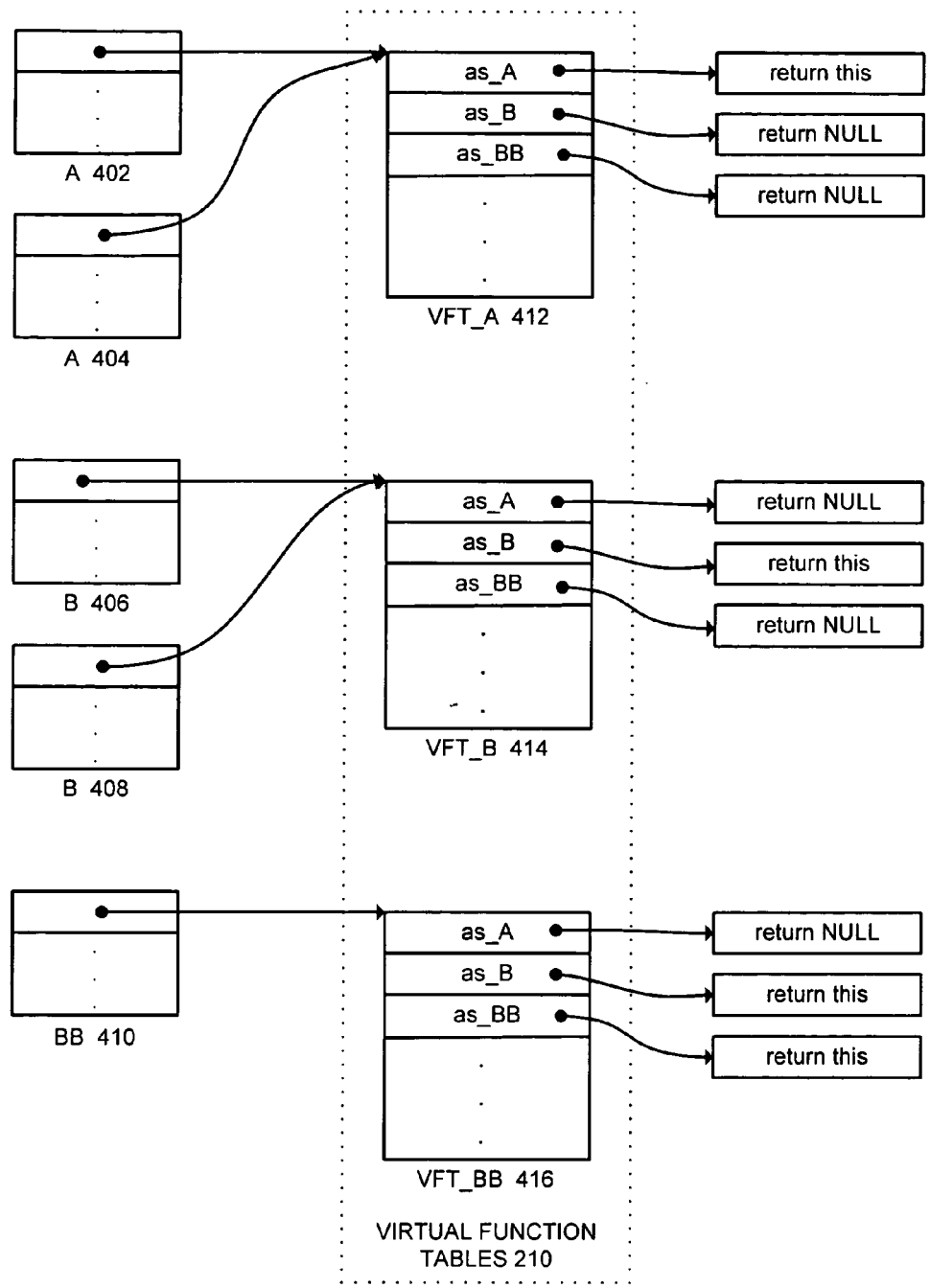
FIG. 4 illustrates virtual function tables in accordance with an embodiment of the present invention.

Table 1 illustrates unsafe downcasting in an object-oriented language.

Table 2 illustrates safe downcasting in an object-oriented language.

Table 3 illustrates optimized safe downcasting in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Compiling Source Code

FIG. 1 illustrates the process of compiling source program text into executable binary code in accordance with an embodiment of the present invention. First, compiler 104 accepts source program text 102 and compiles source program text 102 into a first intermediate form 103. Note that source program text 102 can be written in any object-oriented language and may include source text that adheres to the safe downcasting idiom. Compiler 104 includes optimizer 108. Optimizer 108 performs optimizations on intermediate form 103 that reduce the number of machine cycles required by use of the safe downcasting idiom. The output of optimizer 108 is second intermediate form 105. Compiler 104 then completes compilation of second intermediate form 105 by creating executable binary code 106. Optimizer 108 is described in more detail in conjunction with FIG. 5 below.

Executable Binary Code

FIG. 2 illustrates some components of executable binary code 106 in accordance with an embodiment of the present invention. Executable binary code 106 contains, but is not limited to, code 202, static data initialization values 204, and runtime tables 206. Runtime tables 206 include exception maps 208 and virtual function tables 210. The use of code 202, static data initialization values 204, and exception maps 208 in executable binary code is well-known in the art and will not be discussed further herein. Virtual function tables 210 are described more fully in conjunction with FIG. 4 below.

Class Hierarchy

FIG. 3 illustrates a class hierarchy 302 in accordance with an embodiment of the present invention. Class hierarchy 302 includes base classes base 304 and base2 312. Class base 304 includes derived classes A 306 and B 308. Class B 308, in turn, includes derived class BB 310. Class base2 312 includes derived classes A 314 and C 316. Note that derived class A 306 and class A 314 are distinct and, therefore, are treated as unique by compiler 104 and optimizer 108.

Virtual Function Tables

FIG. 4 illustrates virtual function tables in accordance with an embodiment of the present invention. Virtual function tables 210 includes virtual function table A (VFT_A) 412, VFT_B 414, and VFT_BB 416. VFT_A 412 relates to class A 306, VFT_B 414 relates to class B 308, and VFT_BB 416 relates to class BB 310.

Objects of type A include a pointer to VFT_A 412 as illustrated by objects A 402 and 404, objects of type B include a pointer to VFT_B 414 as illustrated by objects B 406 and 408, while objects of type BB include a pointer to VFT_BB as illustrated by object BB 410. Each of VFT_A 412, VFT_B 414, and VFT_BB 416 include pointers to the methods of the associated derived classes including pointers to the virtual functions as_A, as_B, and as_BB. Note that these virtual functions return values as described by the code within Table 2 indicating that the source text used for generating these functions included the safe downcasting or similar programming idiom.

Optimizer

FIG. 5 illustrates optimizer 108 in accordance with an embodiment of the present invention. Optimizer 108 includes class hierarchy examiner 502 and code modifier 504. Class hierarchy examiner 502 examines virtual function tables 210 to discover use of the safe downcasting idiom. The safe downcasting idiom is recognized when each derived class of a base class has identically named functions which all return a NULL pointer, except for the function in one, or a very small number of, derived classes. This lone function returns the "this" pointer. Note that in the case of a derived function of a derived function, more than one of these identically named functions can return the "this" pointer as shown at VFT_BB 416 in FIG. 4.

A similar idiom is recognized when each derived class of a base class has identically named functions, which all return the same value, except the function in one, or a very small number of, derived classes.

And yet a further generalization of this optimization is the case when all of the identically named functions of the derived classes of a base class do the same calculation, except for the function in one, or a very small number, of the derived classes.

Code modifier 504 replaces the calls to the virtual functions associated with the safe downcasting idiom with a comparison of a virtual function table pointer associated with the object to an address of a virtual function table associated with the given derived class. For example, Table 3 illustrates optimized safe downcasting in accordance with an embodiment of the present invention.

The code in Table 3 replaces the code for function "foo" in Table 2. Note that the condition in the first "if" statement in Table 3, ap = p, p→_VFT == &_A_VFT assigns the pointer "p" to "ap," and then compares the VFT pointed to by "p" to the address of the A_VFT. If these values are equal, the object pointed to by "p" is of derived type "A." Note that of the functions named "as_B" in Table 2, two of them, B::as_B and BB::as_B, return non-NULL. Typically, in a case like this, multiple comparisons need to be performed, for example bp = p, p→_VFT == &_B_VFT || p→_VFT == &_BB_VFT However, the rest of the code in Table 3 shows the result of the Safe Downcasting optimization for a doubly derived class (type BB) in combination with some traditional Boolean logic simplifications, so that each if-statement ends up testing only one comparison.

TABLE 3

```
foo (base * p) {
    class A * ap;
    class B * bp;
    class BB * bbp;
    if (ap = p, p->_VFT == &_A_VFT) {
        // use ap
    } else
    if (bbp = p, p->_VFT == &_BB_VFT) {
        // use bbp
    } else if (bp=p, p->_VFT == &B_VFT) {
        // use bp
    }
}
```

These tests provide the safety of the safe downcasting idiom but use only the following steps:
fetch the virtual function table pointer from p→;
load the constant &_A_VFT; and
compare these two pointers.

The process of replacing the virtual function calls in Table 2 with the comparisons illustrated in Table 3 eliminates one fetch, an indirect function call, and a return from the function call. The latter two steps are expensive in terms of machine cycles used. Therefore, this replacement provides a significant improvement in throughput.

Optimizing Safe Downcasting

FIG. 6 is a flowchart illustrating the process of optimizing safe downcasting in accordance with an embodiment of the present invention. The system starts when object-oriented source text is received for compiling (step 602). Next, the system compiles an intermediate form from the object-oriented source text (step 604). The system then examines the virtual function tables created by the compiler for functions indicating the use of the safe downcasting idiom as described above in conjunction with FIG. 4 (step 606). Next, the system modifies the intermediate form to replace the virtual function calls associated with the safe downcasting idiom with comparisons of a virtual function table pointer associated with the object to an address of a virtual function table associated with the given derived class (step 608). Finally, the system finishes compiling the intermediate form of the code to an output format (typically an executable binary code) (step 604).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing safe downcasting and similar programming idioms in an object-oriented programming language, comprising:
   receiving a source program written in the object-oriented programming language;
   compiling the source program into an intermediate representation using a compiler;
   examining the intermediate representation to identify a use of a virtual function call to determine if an object of a given base class is a member of a given derived class, wherein such usage facilitates safe downcasting of the object from the given base class to the given derived class, wherein examining the intermediate representation involves examining virtual function tables within a class hierarchy in the intermediate representation to locate identically named virtual functions within multiple classes wherein an identically named virtual function of one derived class of a base class returns a pointer to the object and identically named virtual functions of remaining derived classes of the base class return a null pointer;

if the intermediate representation uses the virtual function call in this manner, replacing the virtual function call with a comparison of a virtual function table pointer associated with the object to an address of a virtual function table associated with the given derived class;

completing compilation into the intermediate representation;

linking the intermediate representation into an executable binary code; and storing the executable representation on a computer readable medium.

2. The method of claim 1, wherein the intermediate representation includes virtual function tables generated by the compiler, wherein these virtual function tables are referenced during execution of the executable binary code to perform operations on the object and wherein entries in the virtual function tables point to executable code for objects of a specified class.

3. The method of claim 2, wherein if the identically named virtual function of more than one derived class of the base class returns the pointer to the object and identically named virtual functions of remaining derived classes of the base class return the null pointer, the method further comprises replacing the virtual function call with a sequence of instructions that identify the more than one derived class of the base class.

4. The method of claim 1, wherein examining the intermediate representation involves examining the intermediate representation within an optimizer associated with the compiler.

5. A computer-readable storage medium storing instructions that when executed by a computer cause the computer to perform a method for optimizing safe downcasting and similar programming idioms in an object-oriented programming language, the method comprising:

receiving a source program written in the object-oriented programming language;

compiling the source program into an intermediate representation using a compiler;

examining the intermediate representation to identify a use of a virtual function call to determine if an object of a given base class is a member of a given derived class, wherein such usage facilitates safe downcasting of the object from the given base class to the given derived class, wherein examining the intermediate representation involves examining virtual function tables within a class hierarchy in the intermediate representation to locate identically named virtual functions within multiple classes, wherein an identically named virtual function of one derived class of a base class returns a pointer to the object and identically named virtual functions of remaining derived classes of the base class return a null pointer;

if the intermediate representation uses the virtual function call in this manner, replacing the virtual function call with a comparison of a virtual function table pointer associated with the object to an address of a virtual function table associated with the given derived class;

completing compilation into the intermediate representation;

linking the intermediate representation into an executable binary code; and storing the executable representation on the computer readable medium.

6. The computer-readable storage medium of claim 5, wherein the intermediate representation includes virtual function tables generated by the compiler, wherein these virtual function tables are referenced during execution of the executable binary code to perform operations on the object and wherein entries in the virtual function tables point to executable code for objects of a specified class.

7. The computer-readable storage medium of claim 6, wherein if the identically named virtual function of more than one derived class of the base class returns the pointer to the object and identically named virtual functions of remaining derived classes of the base class return the null pointer, the method further comprises replacing the virtual function call with a sequence of instructions that identify the more than one derived class of the base class.

8. The computer-readable storage medium of claim 5, wherein examining the intermediate representation involves examining the intermediate representation within an optimizer associated with the compiler.

9. An apparatus for optimizing safe downcasting and similar programming idioms in an object-oriented programming language, comprising:

a receiving mechanism configured to receive a source program written in the object-oriented programming language;

a compiling mechanism configured to compile the source program into an intermediate representation using a compiler;

an examining mechanism configured to examine the intermediate representation to identify a use of a virtual function call to determine if an object of a given base class is a member of a given derived class, wherein such usage facilitates safe downcasting of the object from the given base class to the given derived class;

wherein the examining mechanism is further configured to examine virtual function tables within a class hierarchy in the intermediate representation to locate identically named virtual functions within multiple classes, wherein an identically named virtual function of one derived class of a base class returns a pointer to the object and identically named virtual functions of remaining derived classes of the base class return a null pointer;

a replacing mechanism configured to replace the virtual function call with a comparison of a virtual function table pointer associated with the object to an address of a virtual function table associated with the given derived class if the intermediate representation uses the virtual function call in this manner;

wherein the compiling mechanism is further configured to complete compilation into the intermediate representation;

a linking mechanism configured to link the intermediate representation into an executable binary code; and a storing mechanism configured to store the executable representation on a computer readable medium.

10. The apparatus of claim 9, wherein the intermediate representation includes virtual function tables generated by the compiler, wherein these virtual function tables are referenced during execution of the intermediate representation to perform operations on the object and wherein entries in the virtual function tables point to executable code for objects of a specified class.

11. The apparatus of claim 10, wherein the replacing mechanism is further configured to replace the virtual function call with a sequence of instructions that identify the more than one derived class of the base class if the identically named virtual function of more than one derived class of the base class returns the pointer to the object and identically named virtual functions of remaining derived classes of the base class return the null pointer.

12. The apparatus of claim 9, wherein the examining mechanism is further configured to examine the intermediate representation within an optimizer associated with the compiling mechanism.

13. An optimizing means for optimizing safe downcasting and similar programming idioms in an object-oriented programming language, comprising:
 a receiving means for receiving a source program written in the object-oriented programming language;
 a compiling mean for compiling the source program into an intermediate representation using a compiler;
 an examining means for examining the intermediate representation to identify a use of a virtual function call to determine if an object of a given base class is a member of a given derived class, wherein such usage facilitates safe downcasting of the object from the given base class to the given derived class;
 wherein the examining means examines virtual function tables within a class hierarchy in the intermediate representation to locate identically named virtual functions within multiple classes wherein an identically named virtual function of one derived class of a base class returns a pointer to the object and identically named virtual functions of remaining derived classes of the base class return a null pointer;
 a replacing means for replacing the virtual function call with a comparison of a virtual function table pointer associated with the object to an address of a virtual function table associated with the given derived class if the intermediate representation uses the virtual function call in this manner;
 wherein the compiling means further compiles the intermediate representation into the intermediate representation;
 a linking means for linking the intermediate representation into an executable binary code; and
 a storing means for storing the executable representation on a computer readable medium.

14. The optimizing means of claim 13, wherein the intermediate representation includes virtual function tables generated by the compiler, wherein these virtual function tables are referenced during execution of the intermediate representation to perform operations on the object and wherein entries in the virtual function tables point to executable code for objects of a specified class.

15. The optimizing means of claim 14, further comprising replacing means for replacing the virtual function call with a sequence of instructions that identify the more than one derived class of the base class if the identically named virtual function of more than one derived class of the base class returns the pointer to the object and identically named virtual functions of remaining derived classes of the base class return the null pointer.

16. The optimizing means of claim 13, wherein the examining means examines the intermediate representation within an optimizer associated with the compiler.

* * * * *